(12) United States Patent
Lodrige et al.

(10) Patent No.: US 6,920,635 B1
(45) Date of Patent: Jul. 19, 2005

(54) METHOD AND APPARATUS FOR CONCURRENT PROPAGATION OF DATA BETWEEN SOFTWARE MODULES

(75) Inventors: Paul F. Lodrige, Palo Alto, CA (US); Randy S. Fishel, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/513,706

(22) Filed: Feb. 25, 2000

(51) Int. Cl.⁷ .............................................. G06F 9/46
(52) U.S. Cl. ..................................................... 719/314
(58) Field of Search ................................ 719/314, 313; 709/313; 109/313

(56) References Cited

U.S. PATENT DOCUMENTS

| | | | |
|---|---|---|---|
| 3,686,641 A | * 8/1972 | Logan et al. | 709/314 |
| 4,847,754 A | * 7/1989 | Obermarck et al. | 709/104 |
| 5,404,562 A | * 4/1995 | Heller et al. | 712/18 |
| 6,360,220 B1 | * 3/2002 | Forin | 707/8 |

OTHER PUBLICATIONS

Hong Tang, Program transformation and runtime support for threaded MPI execution on shared memory machines, Jul. 1999.*

Henry Massalin, A lock free multiprocessor OS kernel, Jun. 19, 1991.*

AIX Version 4.3 Communications Programming Concepts, 1997, Sun Microsystems.*

Sun Microsystems, Inc. "Solaris 2.6 Software Developer Collection vol. 1, STREAMS Programming Guide," docs.sun.com, 1994–1999.

* cited by examiner

Primary Examiner—Meng-Al T. An
Assistant Examiner—LeChi Truong
(74) Attorney, Agent, or Firm—Beyer Weaver & Thomas LLP (57) ABSTRACT

Improved techniques for managing propagation of data through software modules used by computer systems are disclosed. The improved techniques allow a plurality of threads running on different processors to propagate data between software modules by providing concurrent access to queued data by multiple threads. The techniques are particularly well suited for use with the STREAMS model that uses software models arranged in a stack to provide data communications.

4 Claims, 8 Drawing Sheets

METHOD AND APPARATUS FOR CONCURRENT PROPAGATION OF DATA BETWEEN SOFTWARE MODULES

CROSS-REFERENCE TO RELATED APPLICATIONS

This application is related to U.S. patent application Ser. No. 09/513,705, "METHOD AND APPARATUS FOR MANAGING DATA PROPAGATION BETWEEN SOFTWARE MODULES", filed concurrently herewith, and hereby incorporated herein by reference.

BACKGROUND OF THE INVENTION

1. Field of the Invention

The present invention relates to computing systems and, more particularly, to data communications for computing systems.

2. Description of the Related Art

Recent developments in data communication for computing systems have software modules in a layered model. One feature of UNIX System V uses a layered model of software modules, referred to herein as the STREAMS model. The STREAMS model provides a standard way of dynamically building and passing messages through software modules that are placed in layers in a protocol stack. In the STREAMS programming model, the protocol stack can be dynamically changed, e.g., software modules can be added or removed (pushed and popped) at run-time. Broadly speaking, a "stream" generally refers to an instance of a full-duplex path using the model and data communication facilities between a process in user space and a driver which is typically located within the kernel space of the computing system. In other words, a stream can be described as a data path that passes data in both directions between a stream driver in the kernel space and a process in user space.

Figure 1:
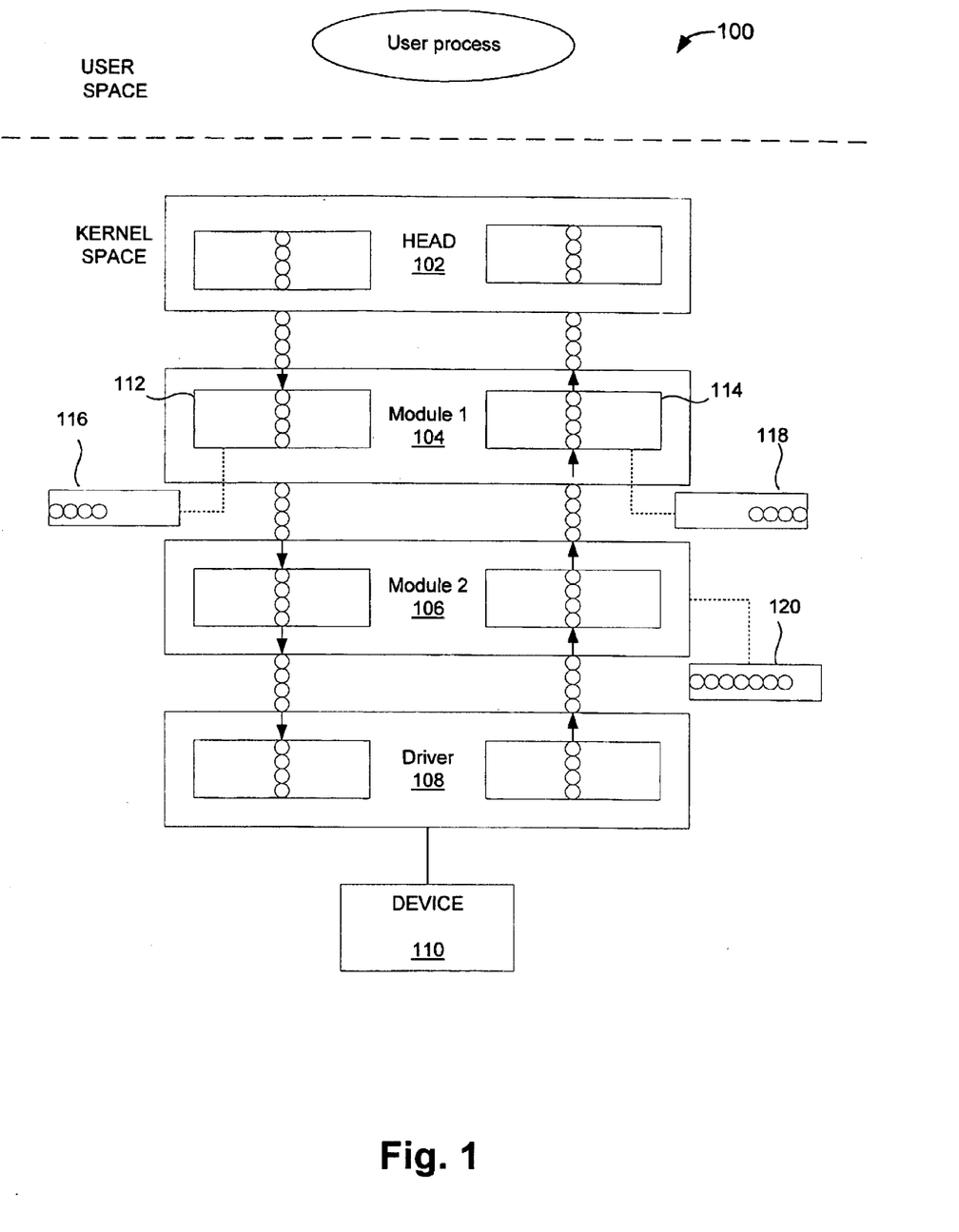
FIG. 1 illustrates a STREAMS programming environment including a stream head, two stream modules, and a streams driver.

FIG. 1 illustrates a STREAMS programming environment 100 including a stream head 102, stream modules 104 and 106, and a streams driver 108. An application program can create a "stream" by opening a device 110. Initially, the stream includes only the stream head 102 and stream driver 108. The stream head 102 is the end of the stream closet to the user process and serves as a user interface between the stream and the user process. Similarly, the stream driver 108 is the end of the stream closest to the device 110 and transfers data between the kernel and the device 110.

After the stream head 104 and stream driver 108 are provided, one or more stream modules, such as stream modules 104 and 106, can be pushed on the stream between the stream head 102 and stream driver 108. An application can dynamically add or remove (push or pop) stream modules on the stream stack at run-time. Each of the stream modules 104 and 106 includes a defined set of kernel-level routines and data structures to process data that passes through these modules. For example, stream modules can operate to convert lower case to upper case, or to add network routing information, etc.

As depicted in FIG. 1, each of the stream head 102, the stream modules 104 and 106, and the stream driver 108 has a pair of queues that can be used as containers for holding messages (e.g., data) traveling upstream or downstream over the stream. For example, a down-queue 112 and a up-queue 114 hold blocks of messages (data) for the stream module 104 and respectively pass the data up the stream to the stream head 102 or down the stream to the stream driver 108. The messages can be ordered within the queues 112 and 114 in first-in first-out basis (FIFO), perhaps according to assigned priorities.

It should be noted that in some situations messages cannot be placed in queues 112 and 114. For example, when a stream queue has reached it allotted size, messages can no longer be placed in that queue. As another example, messages cannot be placed in the queues 112 and 114 when other processing threads have acquired their software locks. In such cases, messages are stored in another queue that can serve as a back-up queue, herein referred to as a "synchronization queue". For example, synchronization queues 116 and 118 depicted in FIG. 1, respectively hold messages that could not be placed into the queues 112 and 114. It should be noted that in the STREAMS model, some stream modules (e.g., Internet Protocol (IP) module) are confined to having only one synchronization queue. As a result, for some stream modules there is only one synchronization queue available to serve as a backup queue. For example, a synchronization queue 120 which is used to hold the messages for the second software module 106.

One problem with conventional implementations of the STREAMS model is that in some instances messages cannot be propagated concurrently by two or more threads (or processes) running on different processors. For example, when a stream module has only one synchronization queue available, access to the synchronization queue cannot conventionally be achieved by two or more threads. This is partly attributed to the fact that in conventional implementations of the STREAMS model that messages can be intermixed in one synchronization queue regardless of their type and/or relative priority. Accordingly, access to the synchronization queue is limited to only one thread at a time. Typically, in conventional implementations of the STREAMS model, a synchronization queue lock is provided to exclude all the threads from accessing the synchronization queue except one single thread which has acquired (or possesses) the synchronization queue lock. For example, a synchronization queue lock can be provided to limit access to the synchronization queue 120 to only one thread at any given time (not shown).

In view of the foregoing, there is a need for improved methods for managing data propagation between software modules.

SUMMARY OF THE INVENTION

Broadly speaking, the invention relates to techniques for concurrent propagation of data through software modules used by computer systems. More particularly, the invention allows a plurality of threads running on different processors to propagate data between software modules by providing concurrent access to queued data by multiple threads. The invention is particularly well suited for use with the STREAMS model that uses software models arranged in a stack to provide data communications.

The invention can be implemented in numerous ways, including a system, an apparatus, a method or a computer readable medium. Several embodiments of the invention are discussed below.

As a method for managing flow of messages between two software modules, one embodiment of the invention includes that acts of: (a) determining whether a first message can be propagated by a first thread running on a first processor between the two software modules while allowing a second thread running on a second processor to propagate a second message between the two software modules; and (b) propagating the first message between the two software modules while allowing the second thread to propagate the second message between the two software modules when said determining (a) determines that the first message can be propagated by the first thread while allowing the second thread to propagate the second message between the two software modules.

As a computer system, one embodiment of the invention includes: a plurality of processors; a first and a second software modules with the second software module having a main queue suitable for storing messages and an auxiliary queue suitable for storing messages that are not stored in the main queue; and a propagation controller operating to enable at least two processors of said plurality of processors to concurrently propagate messages between the first and the second software modules.

As a computer readable media including computer program code for managing flow of messages between two software modules, one embodiment of the invention includes: computer program code for determining whether a first message can be propagated by a first thread running on a first processor between the two software modules while allowing a second thread running on a second processor to propagate a second message between the two software modules; and computer program code for propagating the first message between the two software modules while allowing the second thread to propagate the second message between the two software modules when said computer program code for determining determines that the first message can be propagated by the first thread while allowing the second thread to propagate the second message between the two software modules.

The advantages of the invention are numerous. Different embodiments or implementations may have one or more of the following advantages. One advantage of the invention is that data can be propagated concurrently between software modules by a plurality of threads. Another advantage of the invention is that lock-free data propagation is made possible. Yet another advantage of the invention is that propagation of data can be achieved more quickly and more efficiently.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for allowing multiple processes (or threads) to concurrently propagate data through software modules used by computer systems. More particularly, the invention allows a plurality of threads running on different processors to propagate data between software modules by providing concurrent access to queued data by multiple threads. The invention is particularly well suited for use with the STREAMS model that uses software models arranged in a stack to provide data communications.

Embodiments of the invention are discussed below with reference to FIGS. 2–6B. However, those skilled in the art will readily appreciate that the detailed description given herein with respect to these figures is for explanatory purposes as the invention extends beyond these limited embodiments.

Figure 2:
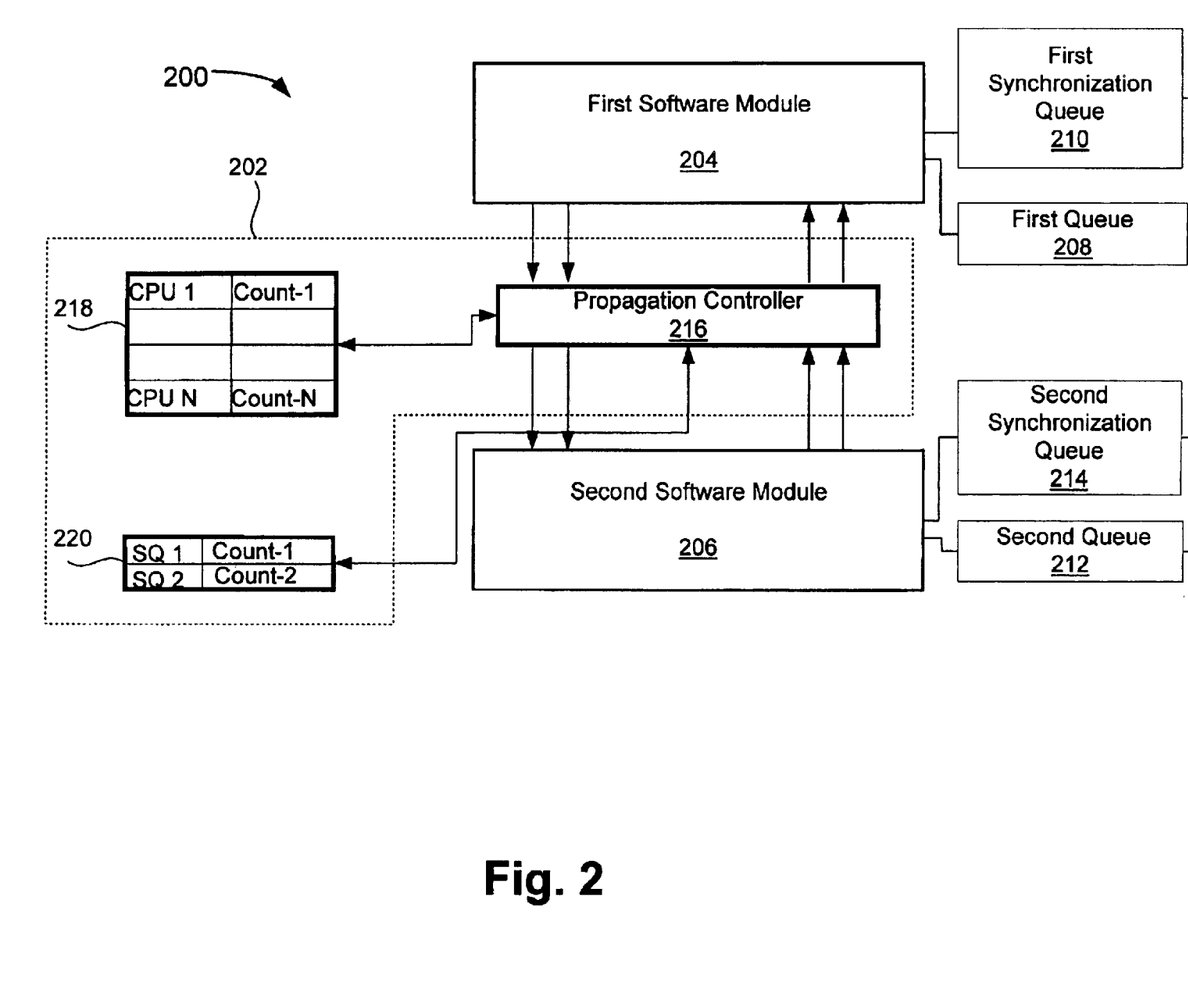
FIG. 2 illustrates a computing environment including an enhanced propagation system suitable for allowing concurrent propagation of messages between software modules in accordance with one embodiment of the present invention.

FIG. 2 illustrates a computing environment 200 including an enhanced propagation system 202 suitable for allowing concurrent propagation of messages between first and second software modules 204 and 206 in accordance with one embodiment of the present invention. More particularly, the enhanced propagation system 202 allows multiple threads running on different processors to propagate data (e.g., messages) between a queue of the first software module 204 and a synchronization queue of the second software modules 206, or vice versa. The first and second software modules 204 and 206 can be part of a stream in a STREAMS model operating environment. As shown in FIG. 2, a first queue 208 and a synchronization queue 210 are provided for the first software module 204. In the STREAMS model operating environment, messages are processed by the first software module 204 and propagated to a subsequent software module (e.g., the second software module 206). Messages processed by the first software module 204 can be stored in the first queue 208. The first synchronization queue 210 can function as a back up queue for the first queue 208. Thus, the messages that cannot be placed in the first queue 208 can often be stored in the first synchronization queue 210. The second queue 212 and synchronization queue 214 store messages for the second software module 206, in the same manner. Although discussion focuses on the propagation of messages from the first software module 204 to the second software module 206, it should be understood that data propagation also likewise occurs from the second software module to the first software module 204.

As shown in FIG. 2, the enhanced propagation system 202 includes a propagation controller 216, a thread-counter 218, and a synchronization queue counter 220. The propagation controller 216 facilitates concurrent propagation of messages between the first and second software modules 204 and 206 by permitting concurrent access to the synchronization queue 210 and/or synchronization queue 214. The thread-counter 218 provides a thread-count for each processor (e.g., central processing unit) that is available in the computing environment 200 to propagate data. The thread-count for each processor indicates the number of threads running on that processor that are propagating messages between the first and second software modules 204 and 206. For example, a thread count of zero for a processor can indicate that no threads running on the processor are currently propagating data. In this way, the propagation controller 216 can determine whether a processor is available to propagate data. When a thread on a processor is assigned to propagate data, the appropriate thread-counter is updated (e.g., incremented to one). The synchronization queue counter 220 can provide information as to whether a synchronization queue is being accessed by a thread. For example, Count-1 and Count-2 of the synchronization queue counter 220 can be provided respectively for the first and second synchronization queues 210 and 214. The propagation controller 216 can use the synchronization queue counter 220 to determine whether synchronization queues 210 and 214 are being accessed by a thread. The operation of the enhanced propagation system 202 will be discussed in greater detail below.

Figure 3:
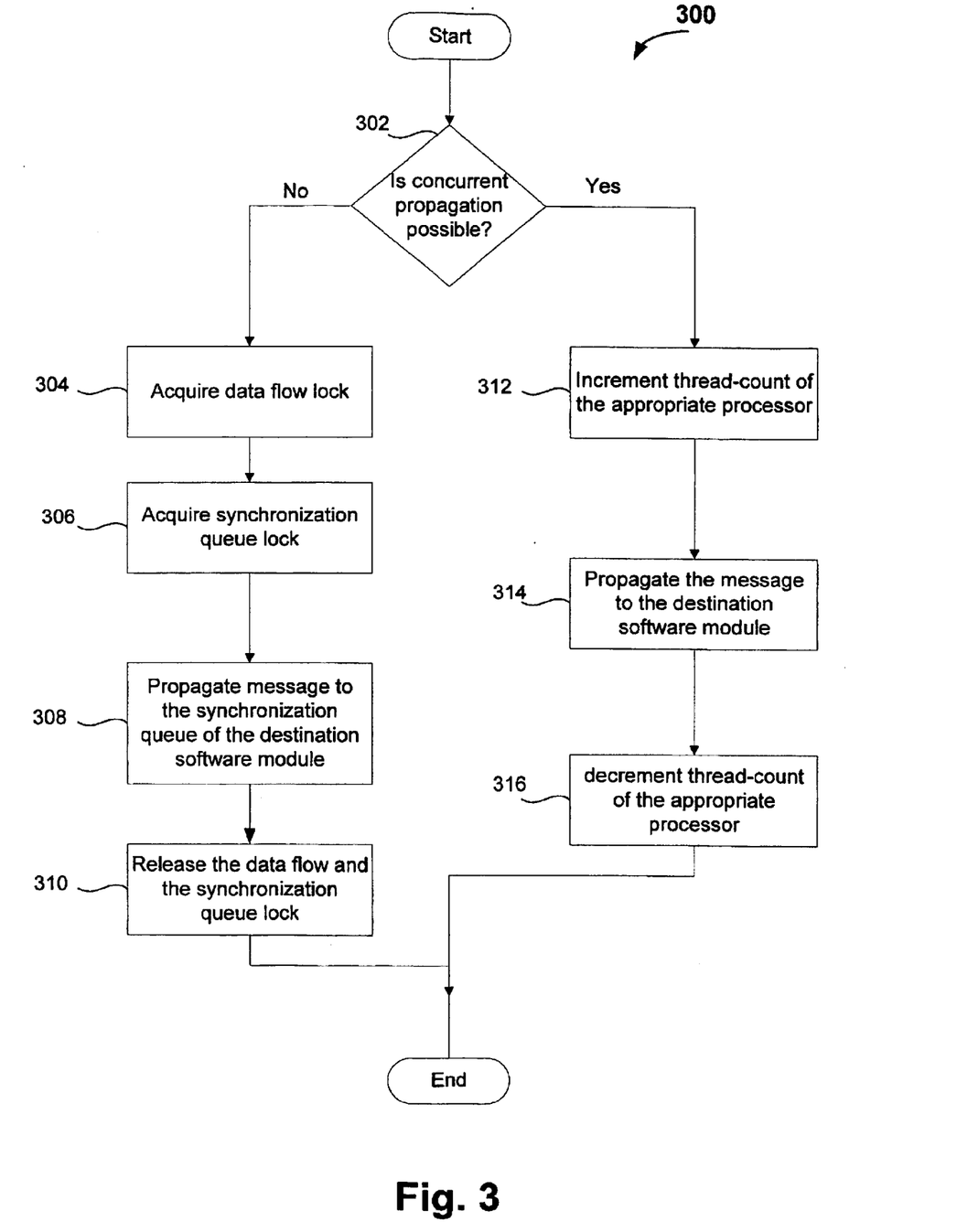
FIG. 3 illustrates a data flow management method configured according to one embodiment of the present invention.

FIG. 3 illustrates a data flow management method 300 configured according to one embodiment of the present invention. The data flow management method 300 can be utilized by the enhanced propagation system 202 of FIG. 2 to allow concurrent propagation of messages between two software modules by multiple threads running on different processors.

Initially, at operation 302, a determination is made as to whether concurrent propagation of data is possible. Generally, concurrent propagation of data is possible when there is no need to prevent other threads from propagating data while a particular thread is propagating data. If operation 302 determines that concurrent propagation of data is not possible, the data flow management method 300 proceeds to operation 304 where a data flow lock is acquired. For example, in the STREAMS model, the data flow lock (e.g., a streams-head lock) prevents any thread, except the thread that possess the lock, from propagating data in the stream. Next, at operation 306, a synchronization queue lock for the synchronization queue of the destination software module is acquired. For example, in the STREAMS model, the lock can be a streams synchronization queue lock which once acquired prevents any thread except the particular thread that possess the lock accessing the synchronization queue. Next, at operation 308, the message is propagated from the source software module (e.g., it queue) to the synchronization queue of destination software module. The data flow lock and synchronization queue lock are both released following propagation of messages at operation 310.

On the other hand, if the operation 302 determines that concurrent propagation of data is possible, the data flow management method 300 proceeds to operation 312 where the thread-count for the appropriate processor is updated (e.g. incremented from zero to one). The appropriate processor is the processor running the thread seeking to propagate data. Next, at operation 314, a message is propagated from the source software module to the destination software module. After the message has been propagated, the thread-count for the appropriate processor is updated (e.g., decremented from one to zero). Following either one of the operations 316 or 310, the data management method 300 ends.

As will be appreciated by those skilled in the art, the message is propagated at operation 314 without preventing other threads from propagating data. More particularly, several threads running on different processors can concurrently propagate data between the software modules when operation 302 determines that data can be propagated concurrently. It should noted that the propagation of the message at operation 314 can be achieved without having to acquire either the data flow lock or the synchronization queue lock described respectively with respect to operations 304 and 306. As a result, there is no need for a thread to wait until a lock can be acquired before a message can be propagated to a subsequent software module. Thus, multiple threads running on different processors can concurrently propagate data.

Figure 4A:
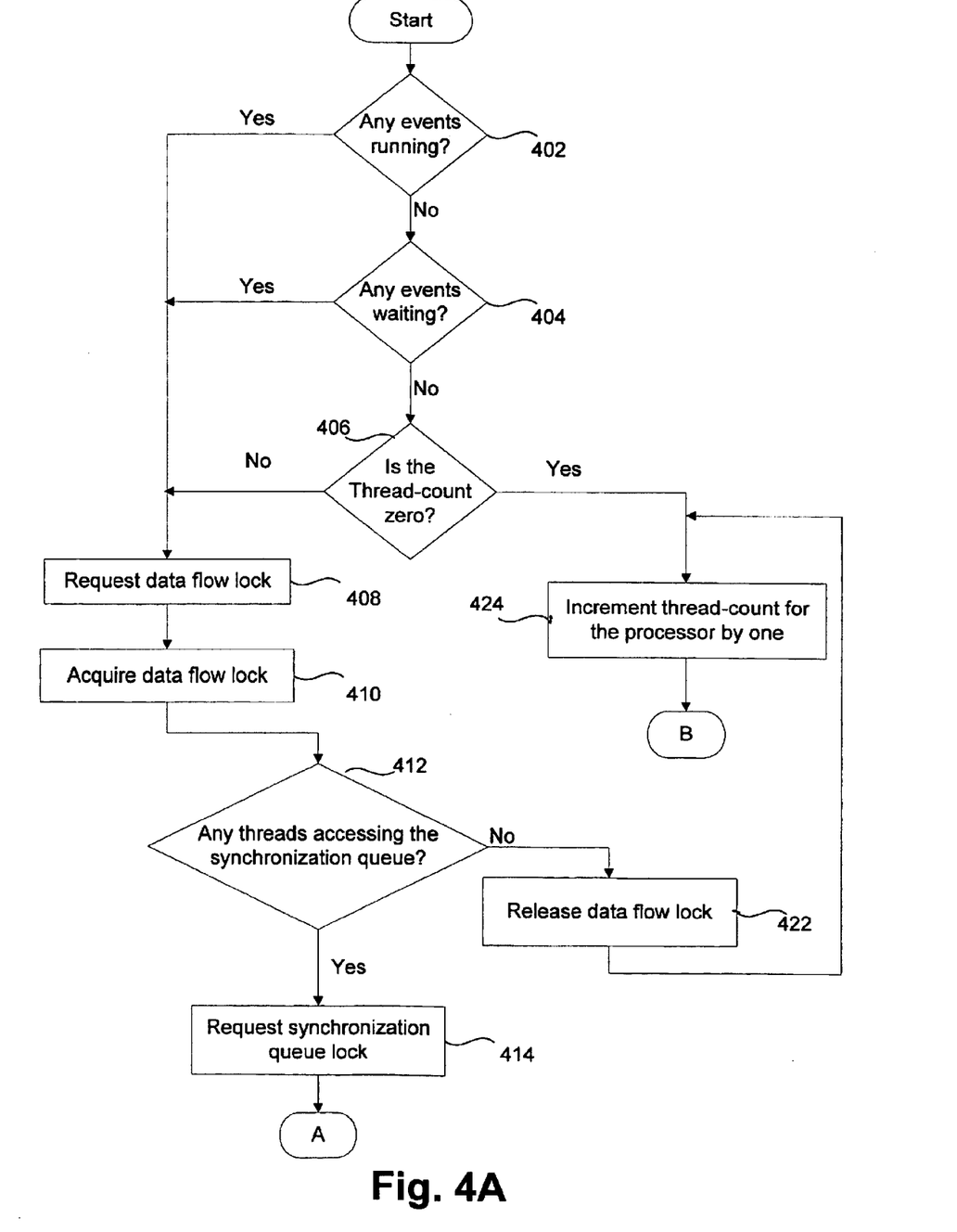
FIGS. 4A and 4B illustrate a data flow management method configured according to another embodiment of the invention.
Figure 4B:
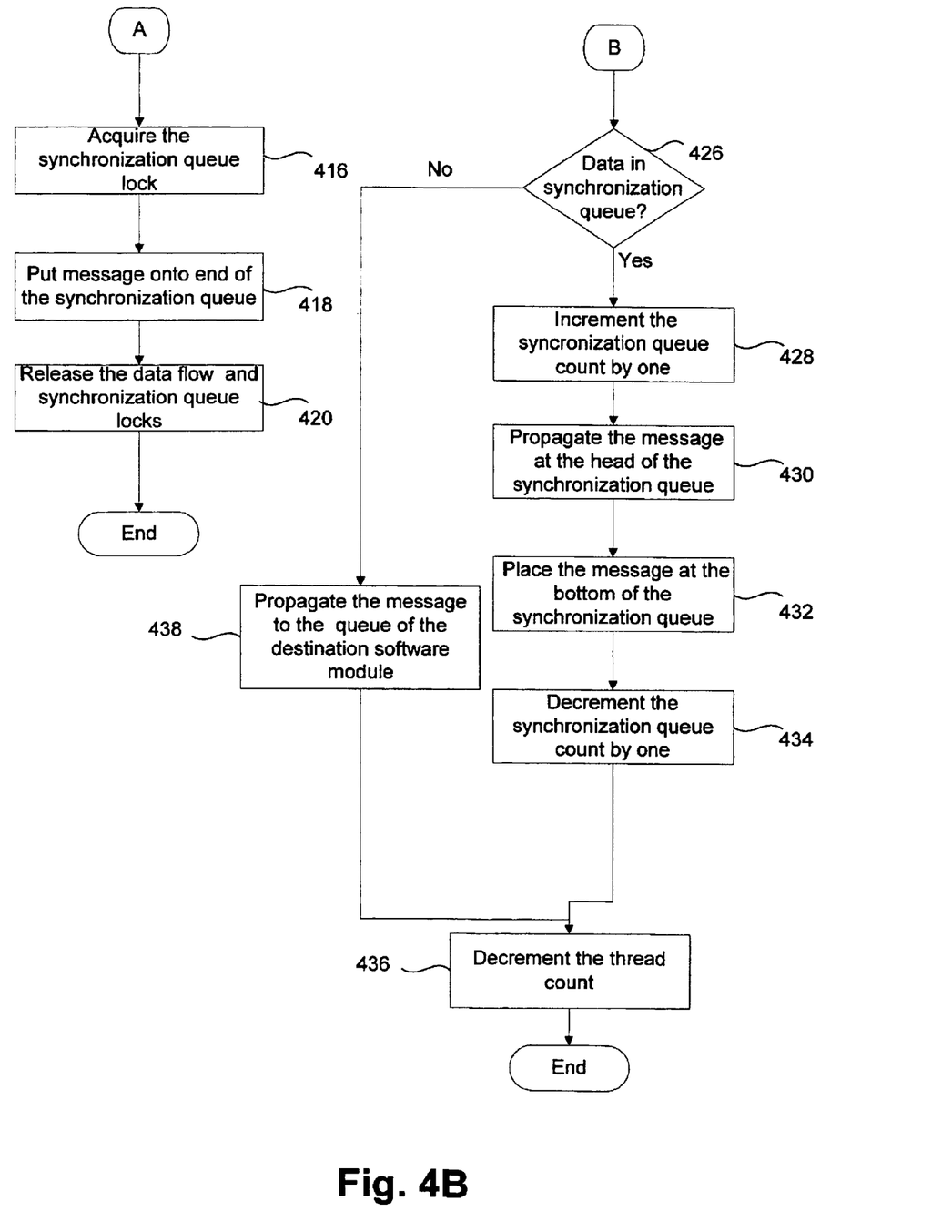

FIGS. 4A and 4B illustrate a data flow management method 400 configured according to one embodiment of the invention. The data flow management method 400 manages flow of messages between software modules configured in a stack. The data flow management 400 can be implemented to utilize a segregated synchronized queue to facilitate temporary storage, processing and passing of messages by one software module to another software module. In this embodiment, it is assumed that the segregated synchronization queue has an event queue container and a plurality of data queue containers. Additional details about segregated synchronization queues can be found in U.S. patent application Ser. No. 09/513,705, entitled "METHOD AND APPARATUS FOR MANAGING DATA PROPAGATION BETWEEN SOFTWARE MODULES" which has been incorporated by reference above.

Initially, at operation 402, a determination is made as to whether any operational events are being processed. If it is determined at operation 402 that no operational events are being processed, a determination is made at operation 404 as to whether any operational events are pending to be processed. Typically, messages should not be processed and/or passed to the next software module when an operational event is being processed or is pending to be processed. The determination at operation 404 can efficiently be performed by checking the event queue container of the segregated synchronized queue to determine whether the event queue container contains a message pertaining to an operational event (event). An event may effect the flow of data and/or how data is to be processed. For example, one such operational event may be related to changing the path of data flow to facilitate re-routing messages through a different physical router. Typically, data pertaining to operational events should be processed before data not pertaining to events is processed. If no events are pending or being processing, the data flow management method 400 proceeds to operation 406 where a determination is made as to whether the thread-count for the processor which is running the thread seeking to propagate data is zero. A zero thread-count indicates that no threads running on the processor are currently propagating data between the software modules.

However, a non-zero thread count indicates that a thread running on the processor is propagating data between the software modules. In the case when threat count is not zero and/or if it determined that an event is running at operation 402 and/or it determined that an event is pending, the data flow management method 400 proceeds to operation 408 where a request is made to acquire a data flow lock. The data flow lock can be implemented as an exclusive software lock that excludes any thread except the thread that has acquired the data flow lock from propagating data between the software modules. When the data flow lock becomes available, the data flow management method 400 proceeds to operation 410 where the data flow lock is acquired. It should be noted that when the data flow lock is acquired, the flow of data is blocked for any other threads that need to propagate data between the software modules. With other threads being prevented from propagating data, the data flow management method 400 proceeds to operation 412 where a determination is made as to whether any threads are accessing the synchronization queue of the software module where messages are being propagated to (destination software module). This determination can be made by checking the synchronization queue counter of the destination software module. If the operation 412 determines that a thread is accessing the synchronization queue of the destination software module, the data flow management method 400 proceeds to operation 414 where a request is made to acquire the synchronization for the synchronization queue lock of the destination software module. When the synchronization queue lock becomes available, the data flow management method 400 proceeds to operation 416 where the lock for the synchronization queue of the destination software module is acquired. When the synchronization queue lock has been acquired, a message can be placed at the end of the synchronization queue of the destination software module at operation 418. Here, the messages is moved from the source software module to the destination software module. Next, at operation 420, both the data flow lock (acquired at operation 410) and the synchronization queue lock of the destination software module (acquired at operation 416) are released. Following the operation 420, the data flow management method 400 ends.

On the other hand, if operation 406 determines that the thread-count for a the appropriate processor is zero, the data flow management method 400 proceeds to operation 424 where the thread-count for the processor is incremented by one. It should be noted that when operation 412 determines that there are no threads accessing the synchronization queue of the destination software module (i.e., synchronization queue count=0), the data flow management method 400 also proceeds to operation 424 after the data flow lock is released at operation 422. In both cases, following the incrementing of the thread-count for the appropriate processor, the data flow management method 400 proceeds to operation 426 where a determination is made as to whether the synchronization queue of the destination software module is empty. It should be noted that if the synchronization queue contains a message, the message from the source software module is not directly propagated to the (main) queue of the destination software module. Rather, the message from the source software module is placed in the synchronization queue of the destination software module. Accordingly, if the operation 426 determines that the synchronization queue is not empty, the synchronization queue counter of the destination software module is incremented by one at operation 428. At operation 430 a message is retrieved from the head of the synchronization queue of the destination software module and propagated to the (main) queue of the destination software module. Next, at operation 432, the message from the source module is placed at the bottom of the synchronization queue of the destination software module. The synchronization queue counter of the destination software module is decremented by one at operation 434. The thread-count is then decremented by one at operation 436. Following the operation 436, the data flow management method 400 ends.

Alternatively, when the determination at operation 426 determines that the synchronization queue of the destination software module is empty, the data flow management method 400 proceeds to operation 438 where the message from the source software module is propagated to the (main) queue of the destination software module. In this case, there is no earlier message waiting in the synchronization queue of the destination software module so that the message can be propagated directly to the (main) queue. Following the operation 436 where the thread-count is decremented by one, the data flow management method 400 ends.

It should be noted that when operations 424–438 are performed the message propagation is achieved without using any software locks. The thread-count allows one thread from each one or more processors to utilize such lock-free data propagation. The synchronization queue count is used also to permit lock-free data propagation but only when no other threads are accessing the synchronization queue. The result of lock-free data propagation is significant improvement in data propagation. Data propagation is achieved more efficiently because less blocking by software locks occurs and because concurrent access to synchronization queue is permitted.

Figure 5A:
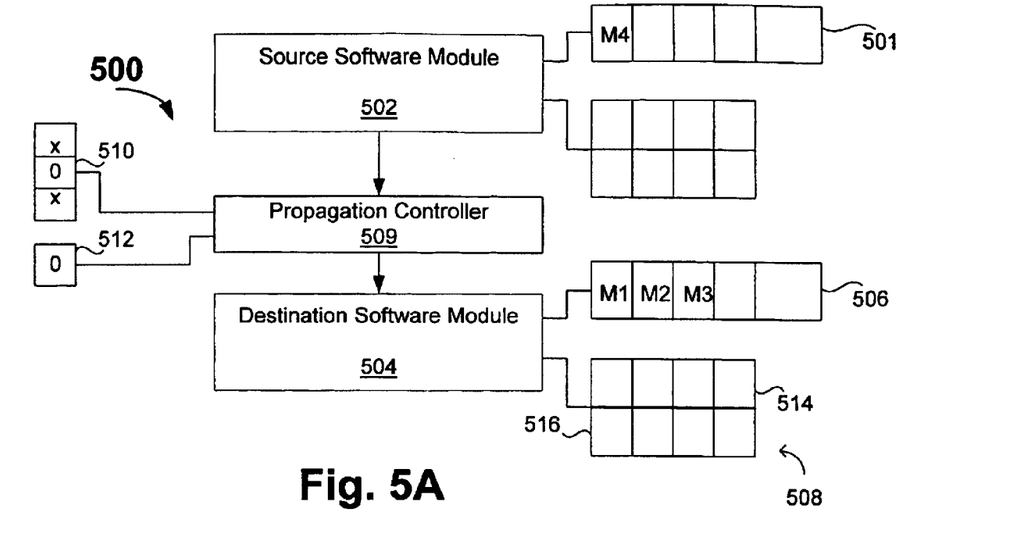
FIGS. 5A–5D illustrate a computing environment in which a representative message is propagated from a (main) queue of a source software module to a destination software module 504 in accordance with various situations of the present invention.
Figure 5B:
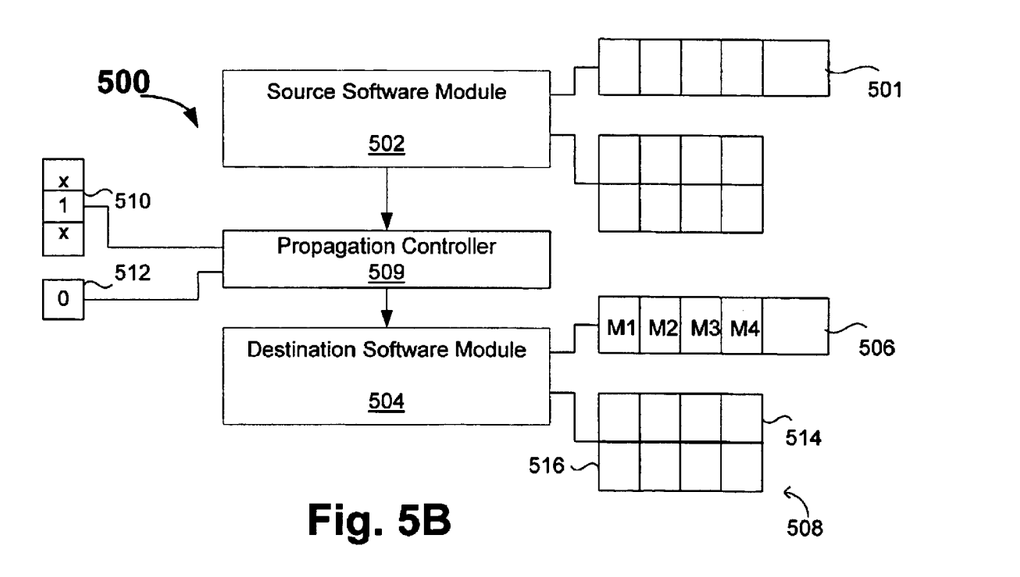

FIGS. 5A and 5B illustrate a computing environment 500 in which a representative message M4 is propagated from a (main) queue 501 of a source software module 502 to a destination software module 504 in accordance with one situation of the present invention. As shown in FIG. 5A, queue 506 and segregated synchronization queue 508 are provided for the destination software module 504. In addition, a propagation controller 509, a thread-count 510 for the appropriate processor and a synchronization queue count 512 are provided to facilitate the propagation of the message M4 from the queue 501 of the source software module 502 to the destination software module 504. In the environment depicted in FIG. 5A, both the thread-count 510 and synchronization queue count 512 are at zero. A zero thread count indicates that there is no thread propagating data on the appropriate processor. Similarly, a zero on the synchronization queue counter 512 indicates that there is no thread accessing the synchronization queue 512. It should be noted that in the situation depicted in FIG. 5A, the synchronization queue 508 is empty. That is, there are no events pending in the event queue 514 and there are no data messages in the data queues 516. In this situation, similar to the case of operation 438 of FIG. 4, the thread-count 510 is incremented to 1 and the message M4 is propagated to the queue 506 of the destination software module 504. FIG. 5B illustrates the computing environment 500 after M4 is propagated. It should be noted that the thread-count 510 is decremented back to zero following the propagation of message M4 to the queue 506 (not shown in FIG. 5B).

Figure 5C:
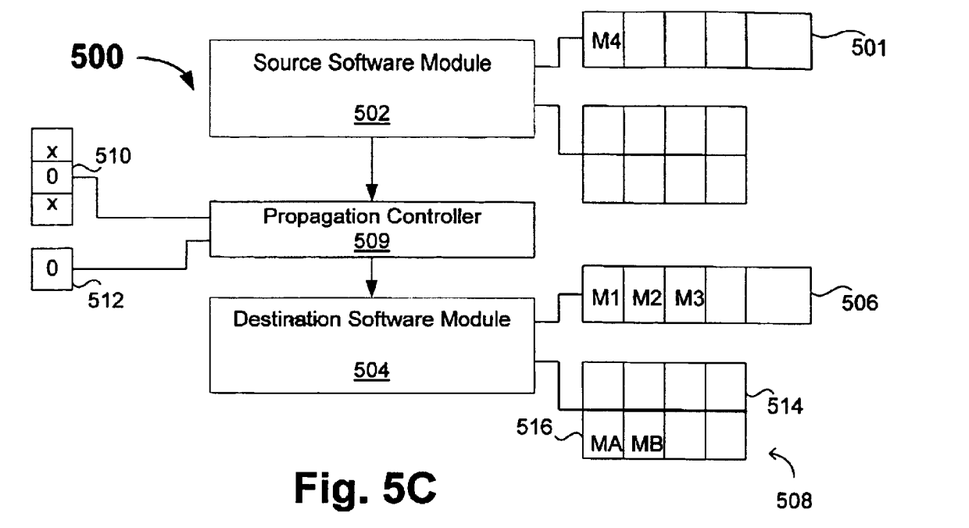
Figure 5D:
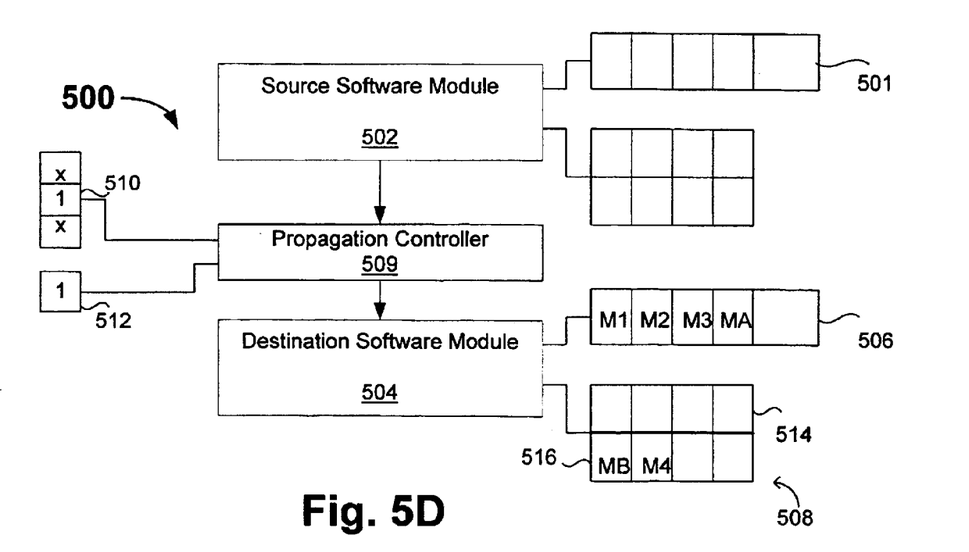

FIGS. 5C and 5D illustrate propagation of a message M4 from the (main) queue 501 of the source software module 502 to a destination software module 504 in accordance with another situation of the present invention. FIG. 5C depicts an environment similar to FIGS. 5A and 5B. However, it should be noted that in the situation depicted in FIG. 5C, the synchronization queue 508 is not empty. More specifically, the data queue 516 of the synchronization data queue 508 contains data messages MA and MB. In this situation, the message M4 is placed at the bottom of the data queue 516 and the message MA is retrieved from the top of the data queue 506 and propagated to the queue 506 of the destination software module 504. (operations 430 and 432 of FIG. 4).

Figure 6A:
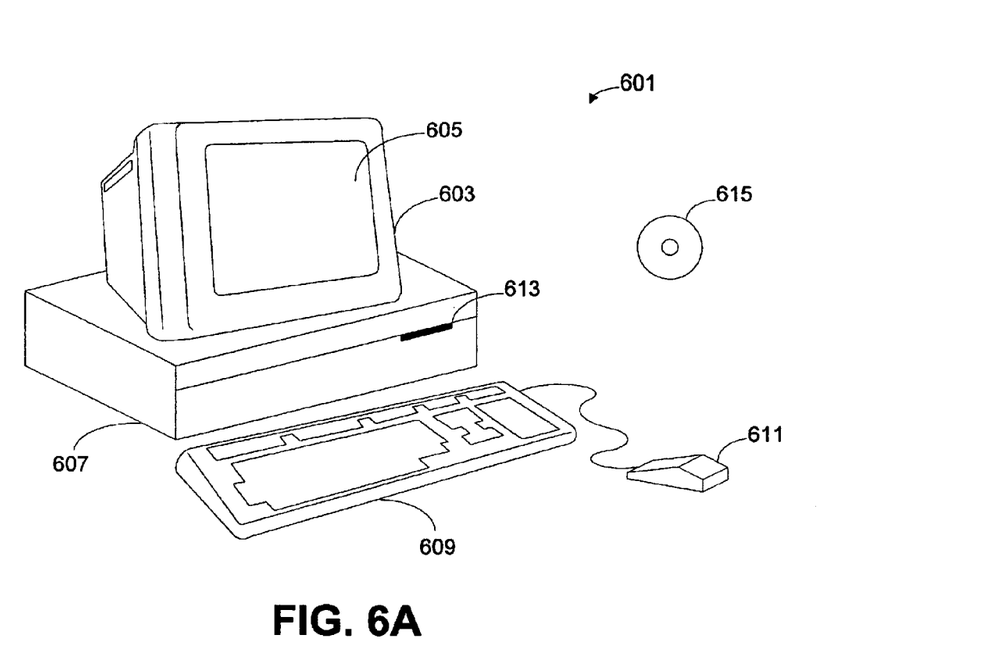
FIGS. 6A and 6B illustrate an example of a computer system that may be used in accordance with the invention.
Figure 6B:
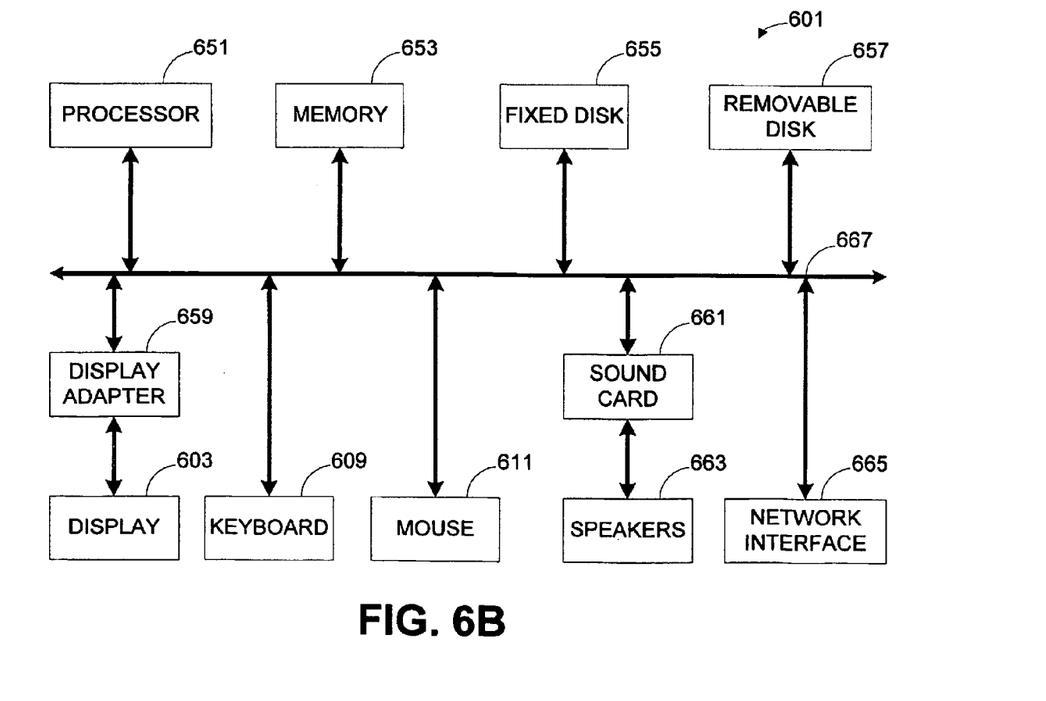

FIGS. 6A and 6B illustrate an example of a computer system that may be used in accordance with the invention. FIG. 6A shows a computer system 601 that includes a display 603, screen 605, cabinet 607, keyboard 609, and mouse 611. Mouse 611 may have one or more buttons for interacting with a graphical user interface. Cabinet 607 houses a CD-ROM drive 613, system memory and a hard drive (see FIG. 6B) which may be utilized to store and retrieve software programs incorporating computer code that implements the invention, data for use with the invention, and the like. Although CD-ROM 615 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 601 is provided in the system memory, the hard drive, the CD-ROM 615 or other computer readable storage medium and serves to incorporate the computer code that implements the invention.

FIG. 6B shows a system block diagram of computer system 601 used to execute the software of an embodiment of the invention. As in FIG. 6B, computer system 601 includes monitor 603 and keyboard 609, and mouse 611. Computer system 601 further includes subsystems such as a central processor 651, system memory 653, fixed storage 655 (e.g., hard drive), removable storage 657 (e.g., CD-ROM drive), display adapter 659, sound card 661, speakers 663, and network interface 665. The central processor 651, for example, can execute computer program code (e.g., an operating system) to implement the invention. An operating system is normally, but necessarily) resident in the system memory 653 during its execution. Other computer systems suitable for use with the invention may include additional or fewer subsystems. For example, another computer system could include more than one processor 651 (i.e., a multiprocessor system) or a cache memory.

The system bus architecture of computer system 601 is represented by arrows 667. However, these arrows are illustrative of any interconnection scheme serving to link the subsystems. For example, a local bus could be utilized to connect the central processor to the system memory and display adapter. Computer system 601 shown in FIG. 6B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations, may have one or more of the following advantages. One advantage of the invention is that data can be propagated concurrently between software modules by a plurality of threads. Another advantage of the invention is that lock-free data propagation is made possible. Yet another advantage of the invention is that propagation of data can be achieved more quickly and more efficiently.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer system for managing flow of messages comprising:

a plurality of processors;

first and second layer software modules, the second software module having a main queue suitable for storing messages and a segmented auxiliary queue suitable for storing messages that are not stored in the main queue;

wherein the segmented auxiliary queue is configured for storing and processing operational messages separately from data messages, said operational messages relating to operational events associated with managing flow of data between the first layer software module and the second layer software module; and a propagation controller for propagating messages between the first and the second layer software modules, the propagation controller operating to enable at least two processors of said plurality of processors to concurrently propagate messages to or from the segmented auxiliary queue of the second software module wherein the propagation controller comprises:

a thread-count for one of the plurality of processors; and a queue count for the segmented auxiliary queue;

wherein the segmented auxiliary queue is a segmented synchronization queue and the queue count is a segmented synchronization queue count.

2. A computer system as recited in claim 1, wherein the at least two processors of said plurality of processors concurrently propagate a message from the first software module to the segmented auxiliary queue of the second software module.

3. A computer system as recited in claim 1, wherein the at least two processors of said plurality of processors concurrently propagate a message from the first software module to the main queue of the second software module.

4. A computer system as recited in claim 1, wherein the first and second software modules are implemented in a stack as STREAMS modules.

* * * * *